(12) United States Patent
Piroozmandi et al.

(10) Patent No.: US 9,056,525 B2
(45) Date of Patent: Jun. 16, 2015

(54) ANTI-SKID SYSTEMS FOR VEHICLE TIRES ON ICY ROAD CONDITIONS AND METHOD THEREFOR

(71) Applicant: The Boeing Company, Seal Beach, CA (US)

(72) Inventors: Farid Piroozmandi, Kirkland, WA (US); Kelly L. Boren, Marysville, WA (US); Sergey D. Barmichev, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 186 days.

(21) Appl. No.: 13/732,960

(22) Filed: Jan. 2, 2013

(65) Prior Publication Data

US 2014/0183879 A1    Jul. 3, 2014

(51) Int. Cl.
*B60B 39/08* (2006.01)
*B60B 39/02* (2006.01)
*B60B 39/04* (2006.01)

(52) U.S. Cl.
CPC ............... *B60B 39/02* (2013.01); *B60B 39/086* (2013.01); *B60B 39/026* (2013.01); *B60B 39/04* (2013.01); *B60Y 2200/10* (2013.01)

(58) Field of Classification Search
CPC .... B61C 15/085; B61C 15/08; B60B 39/086; B60B 39/26; B60B 39/04; B60B 39/08; B60B 39/083; B60T 8/56

USPC ................................................. 291/1, 2, 3, 15
See application file for complete search history.

(56) References Cited

U.S. PATENT DOCUMENTS

| | | | |
|---|---|---|---|
| 3,870,352 A * | 3/1975 | Engler et al. ..................... 291/15 |
| 6,923,512 B2 * | 8/2005 | Andersson et al. ........... 303/174 |
| 8,465,061 B1 * | 6/2013 | Reid ............................... 291/38 |
| 2002/0079707 A1 * | 6/2002 | Skarie et al. ..................... 291/38 |

FOREIGN PATENT DOCUMENTS

| | | |
|---|---|---|
| DE | 19516958 A1 | 11/1996 |
| WO | 0043223 | 7/2000 |
| WO | 2010136960 A2 | 12/2010 |

OTHER PUBLICATIONS

English translation of German reference 195 16 958.*
Liquid Spray Tire Chain; http://www.sportsimportsltd.com/lisptichgr.html; Sports Imports, LTD.; 1 page; retrieved Jan. 2, 2013.
International Search Report and Written Opinion of international application No. PCT/US2013/073448; Apr. 8, 2014; 9 pages.

* cited by examiner

*Primary Examiner* — Mark Le
(74) *Attorney, Agent, or Firm* — Armstrong Teasdale LLP

(57) ABSTRACT

A method of increasing the friction between a tire of a vehicle and an icy surface includes dispensing a cooling agent such that at least a portion of the dispensed cooling agent is distributed between the tire of the vehicle and the icy surface.

18 Claims, 9 Drawing Sheets

_US 9,056,525 B2_

ANTI-SKID SYSTEMS FOR VEHICLE TIRES ON ICY ROAD CONDITIONS AND METHOD THEREFOR

FIELD

The field of the disclosure relates generally to anti-skid systems and methods for vehicle tires.

BACKGROUND

During braking, vehicle tires rely on friction (or traction) between the tire and the contact surface (i.e., the ground) in order to decelerate or stop the vehicle. In some situations, the contact surface may become contaminated with ice. The ice reduces the friction between the tire and the contact surface, and in many instances will cause the tire to skid, especially when the vehicle is attempting rapid deceleration. Such skidding increases the distance necessary to stop the vehicle, and in some instances can cause the operator to lose control of the vehicle and leading to an undesirable condition.

Typically, existing systems may rely on studded tires, tire chains, deeply grooved tires, or reduced tire pressure to increase the friction of the tire to the contact surface during icy contact surface conditions. However, such systems may actually reduce the effectiveness of the tire on dry surfaces, thus requiring an operator to change the tires during icy conditions. Such changing of the tires may be impractical, especially on large commercial vehicles such as aircraft and trucks. Alternatively, high friction materials such as sand or gravel may be spread on the contact surface in an attempt to reduce skidding of tires. However, such high friction materials may cause damage to vehicles due to the material being flung from tires, becoming airborne and striking the vehicles.

Such high friction materials may also be unsuitable for certain environments, such as aircraft runways. For example, due to the operation of turbine engines on aircraft runways, the high friction materials (which may be referred to herein as foreign object debris (FOD)) may be sucked into the intake of the turbine engines causing damage to the engine. There is thus a need for an anti-skid system that remedies such issues.

BRIEF DESCRIPTION

In one aspect, a system for increasing friction between a tire and an icy surface includes a supply of a cooling agent and a conduit in fluid communication with the supply of cooling agent. An outlet dispenses the cooling agent from the conduit. The outlet is configured to supply the dispensed cooling agent to at least one of the icy surface and the tire.

In another aspect, an aircraft landing system includes a landing gear including at least one tire and a supply of a cooling agent. A conduit is in fluid communication with the supply of cooling agent. An outlet for dispensing the cooling agent from the conduit is configured to supply the dispensed cooling agent to at least one of the icy surface and the tire.

In yet another aspect, a method of increasing the friction between a tire of a vehicle and an icy surface includes dispensing a cooling agent such that at least a portion of the dispensed cooling agent is distributed between the tire of the vehicle and the icy surface.

The features, functions, and advantages that have been discussed can be achieved independently in various embodiments or may be combined in yet other embodiments further details of which can be seen with reference to the following description and drawings.

DETAILED DESCRIPTION

Figure 1:
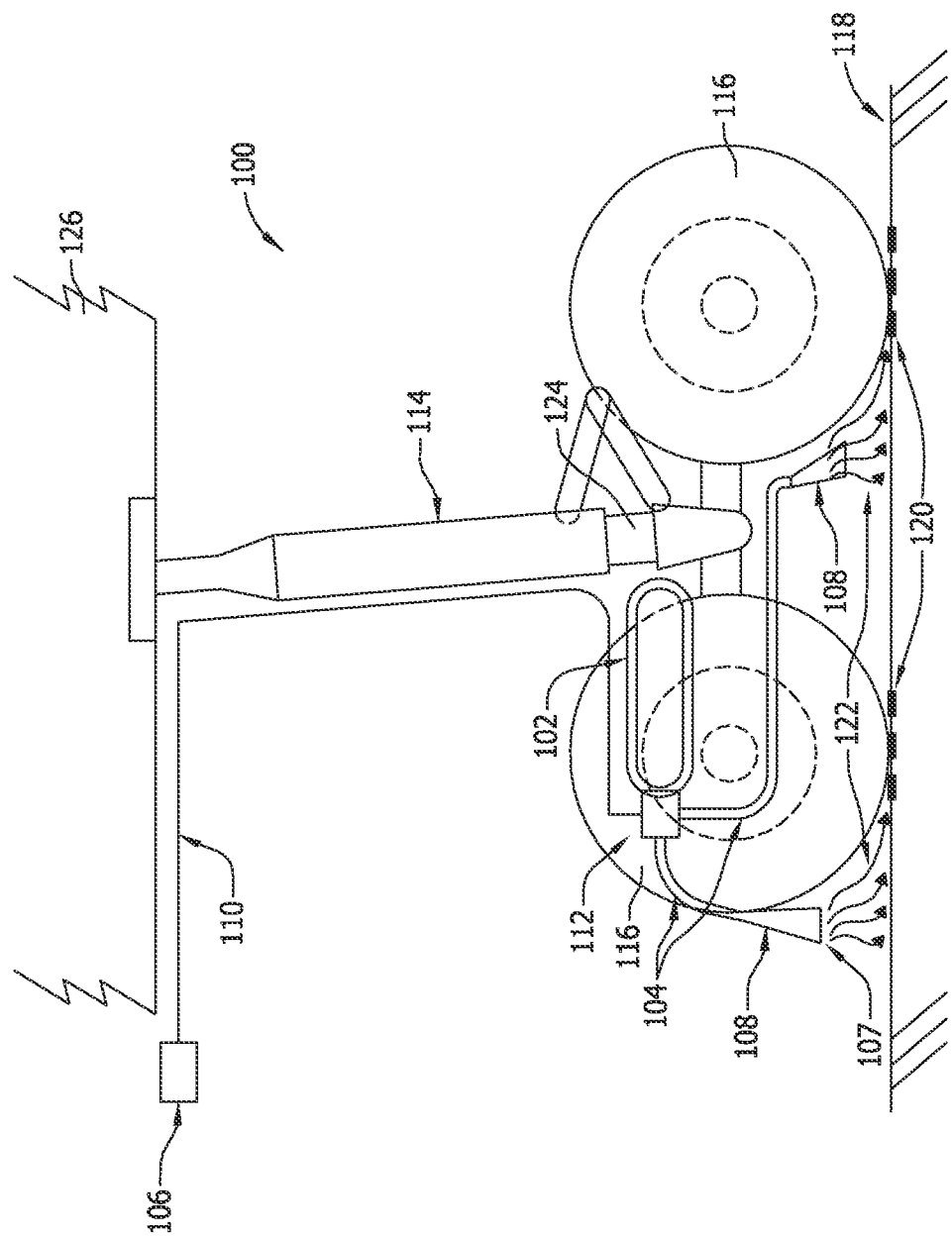
FIG. 1 illustrates an exemplary anti-skid system applying the cooling agent between the tire and icy surface.

Exemplary implementations of the disclosure are described herein with reference to the figures. Accordingly, unless otherwise indicated, like reference numerals refer to like components in the figures.

Figure 2:
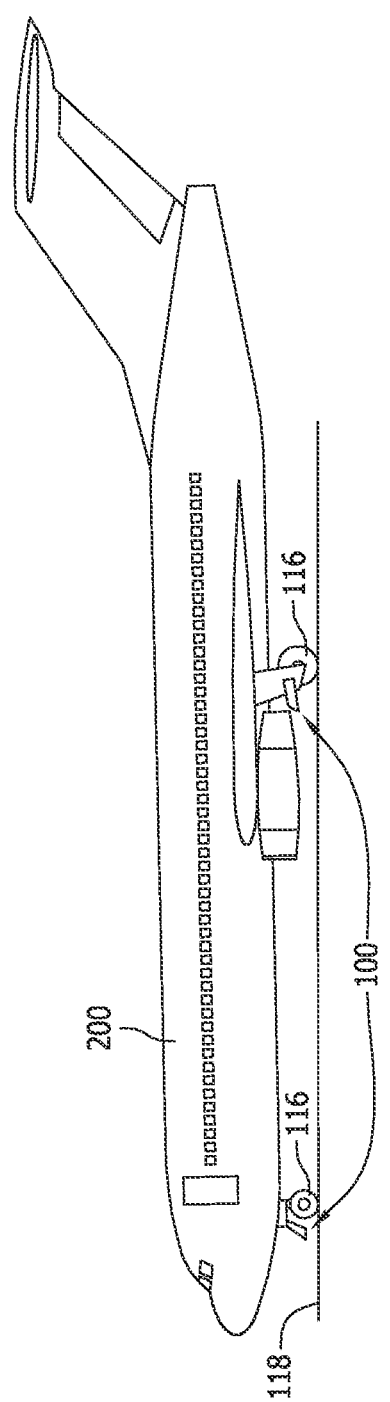
FIG. 2 illustrates a side view of an aircraft incorporating an exemplary anti-skid system.

Reference is now made to FIGS. 1 and 2. FIG. 1 shows generally an anti-skid system 100 of an implementation coupled to a vehicle 126. The exemplary implementation includes a supply of cooling agent 102, a cooling agent supply conduit 104, a controller 106, an outlet 107, a nozzle 108, a signal transmission device 110, and a valve 112. As shown, the anti-skid system may be in proximity to, or coupled to, a tire support 114. The tire support 114 supports one or more tires 116. As will be understood, tires 116 may be coupled to a wheel, axle, hub or the like. As illustrated, the tire support 114 is a landing gear of an aircraft 200 (FIG. 2), but may be any tire support used for ground vehicles using tires such as automobiles, trucks, motorcycles or the like or any other vehicle using tires.

As shown, the tires 116 are in contact with a surface 118, which may be the ground, a roadway, a runway or the like. The surface 118 may include one or more icy patches 120. As used herein, the phrase "icy surface" may refer to a surface (such as surface 118) including one or more icy patch 120. It is noted that icy patches 120 may be any low, or reduced friction patch that allows the system to function as described herein, such as a wet patch or the like and is not limited only to ice.

The anti-skid system 100 includes a supply of a cooling agent 102. The cooling agent may be carbon dioxide ($CO_2$) (providing for a supply of carbon dioxide,) such as liquid, gaseous (e.g., pressurized gas) or solid $CO_2$ (i.e., dry ice). However, the cooling agent is not limited to $CO_2$ and may be any cooling agent that allows the anti-skid system to function as described herein. Although the supply of cooling agent 102 is shown coupled to the tire support 114, the supply of cooling agent 102 may be mounted anywhere on or within vehicle 126. The supply of cooling agent 102 is in fluid communication with the valve 112, the fluid conduit 104 and the outlet 107. When valve 112 is in an open state, a flow of cooling agent passes through conduit 104, and is dispensed through outlet 107, which is part of the dispensing nozzle 108. The dispensed cooling agent is shown in FIG. 1 at 122. In some implementations, conduit 104 and/ or nozzle 108 is configured to allow the cooling agent to expand therethrough, such that at least a portion of the dispensed cooling agent 122 is in the form of granules or particulate (e.g., such as dry ice). In yet another implementation, when the supply of cooling agent is a solid, an auger or the like may be positioned at least partially within conduit 104 to transfer solid cooling agent from the supply of cooling agent 102 to the outlet 107. One embodiment includes supplying a pressurized gas medium, such as Nitrogen gas, Nitrogen Dioxide gas or air (as a flow additive operating as a flow enhancing material) with the cooling agent for facilitating dispensing of the cooling agent.

Figure 9:
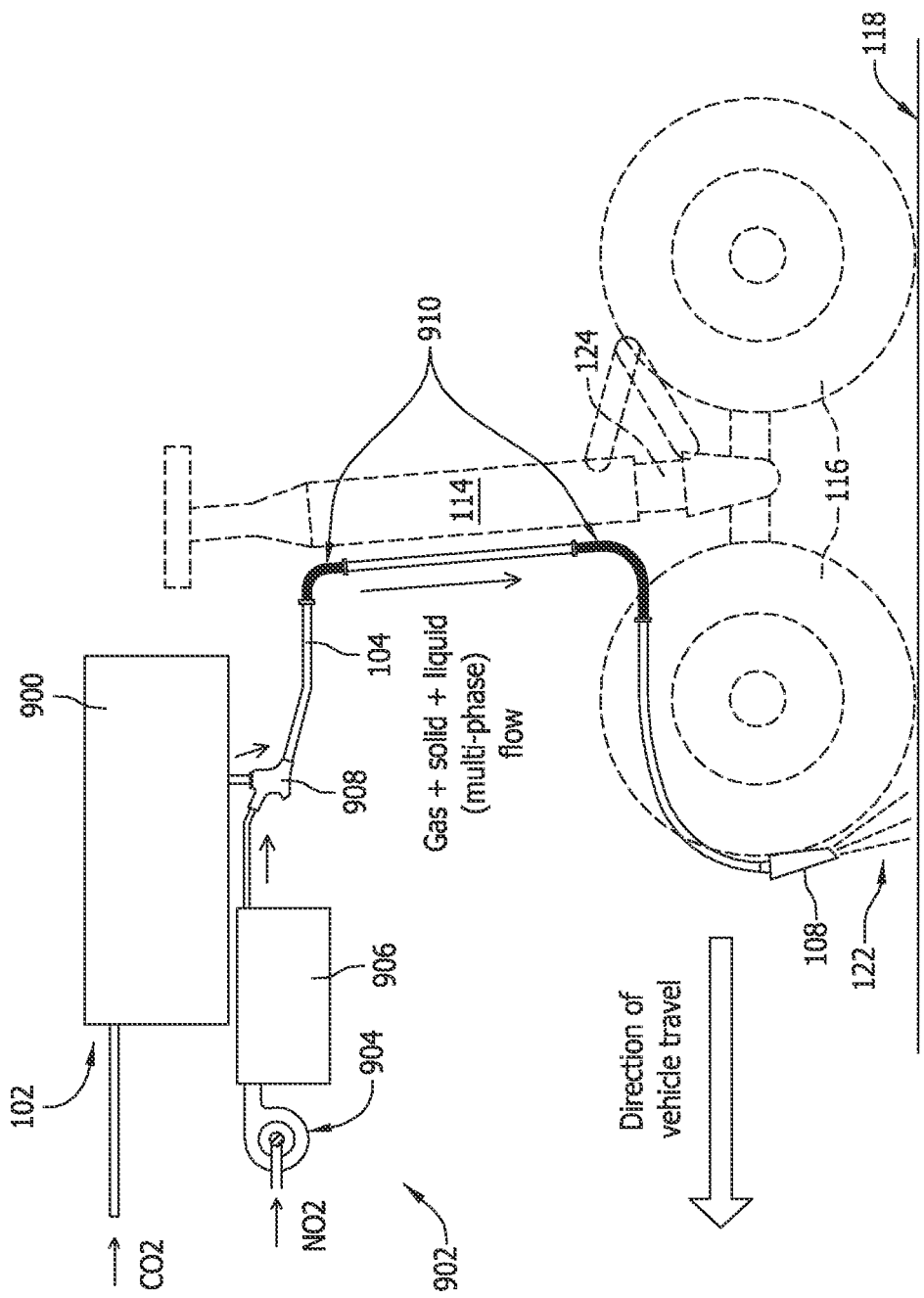
FIG. 9 is a schematic view of an exemplary anti-skid system including a cooling agent generator.

In the embodiment shown in FIG. 9, the supply of cooling agent 102 includes a cooling agent generator 900. In the exemplary embodiment, the cooling agent generator 900 is configured to produce a supply of dry ice particles or liquid $CO_2$ to be used as cooling agent 122. The dry ice particles are evaporative particles capable of transforming from a solid particle phase into a gaseous phase. For example, the cooling agent generator may be a dry ice generator. Such dry ice generators are known devices, and the operation of such devices to generate dry ice is not further discussed herein. In some embodiments, to improve the flowability of the dry ice particles or liquid $CO_2$ through conduit 104, a supply of nitrogen dioxide gas 902 is provided in fluid communication with conduit 104. In the implementation shown, the supply of nitrogen dioxide gas 902 includes a compressor 904 for compressing the nitrogen dioxide gas and a chiller 906 for reducing the temperature of the nitrogen dioxide gas. A mixer 908, such as a Bernoulli mixer, is in fluid communication with the supply of nitrogen dioxide gas 902 and the cooling agent generator 900. The mixer 908 mixes the nitrogen dioxide gas exiting the supply of nitrogen dioxide 902 and the cooling agent supplied by the cooling agent generator 900 before the mixture is transported through conduit 104 to the nozzle 108. In this embodiment, the cooling agent 122 exiting the nozzle 108 is mixed with the nitrogen dioxide. In some embodiments, the conduit 104 may include one or more flexible conduit portions 910, to compensate for movement of the vehicle 126.

In one implementation, the controller 106 is in electronic communication with valve 112, by signal transmission device 110. As shown in FIG. 1, signal transmission device is a cable. However, signal transmission device may be any device allowing for communication between valve 112 and controller 106, such as a Wi-Fi device, Bluetooth device, radiofrequency device, infrared device or the like.

In another implementation, controller 106 is in communication with a sensor 124 that detects a parameter of the vehicle 126 (e.g., aircraft 200 shown in FIG. 2). In one aspect, sensor 124 is a weight sensor that detect when weight is applied to tires 116 sensing a weight-on-wheels condition. In other implementations, the sensor 124 may be a sensor configured to detect one or more sensed conditions such as vehicle speed, tire-skid, tire pressure, atmospheric conditions comprising atmospheric pressure, temperature, humidity level or the like. In some aspects, the controller 106 may receive a signal from sensor 124, indicating that sensor 124 has detected a predetermined condition. At such time, controller 106 may then control the valve 112 to open or close based upon the detected condition, controlling the timing, the dispensing amount, and the dispensing time of the dispensed cooling agent.

Figure 3:
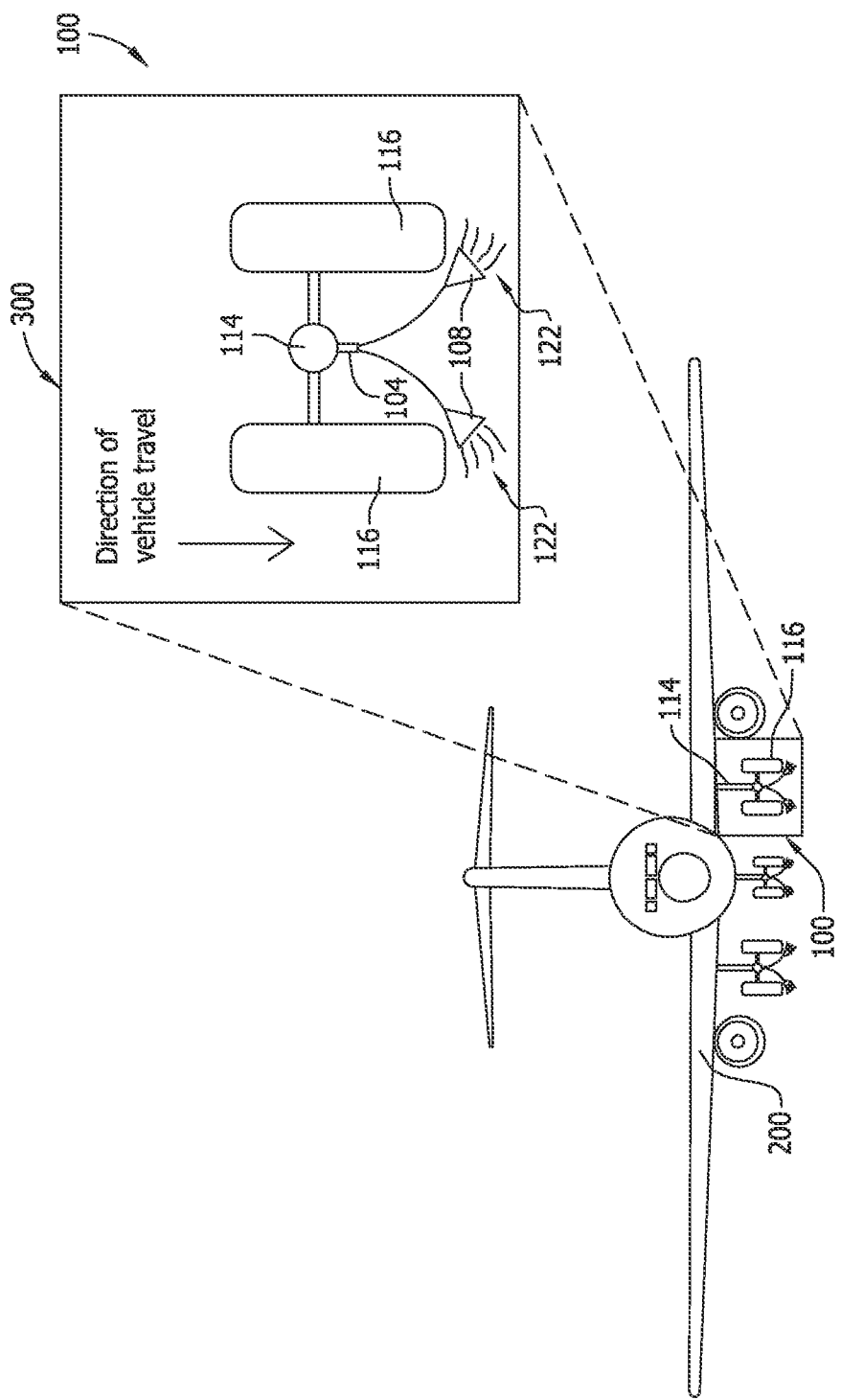
FIG. 3 illustrates an implementation of an exemplary anti-skid system, with individual nozzles for each forward tire.
Figure 6:
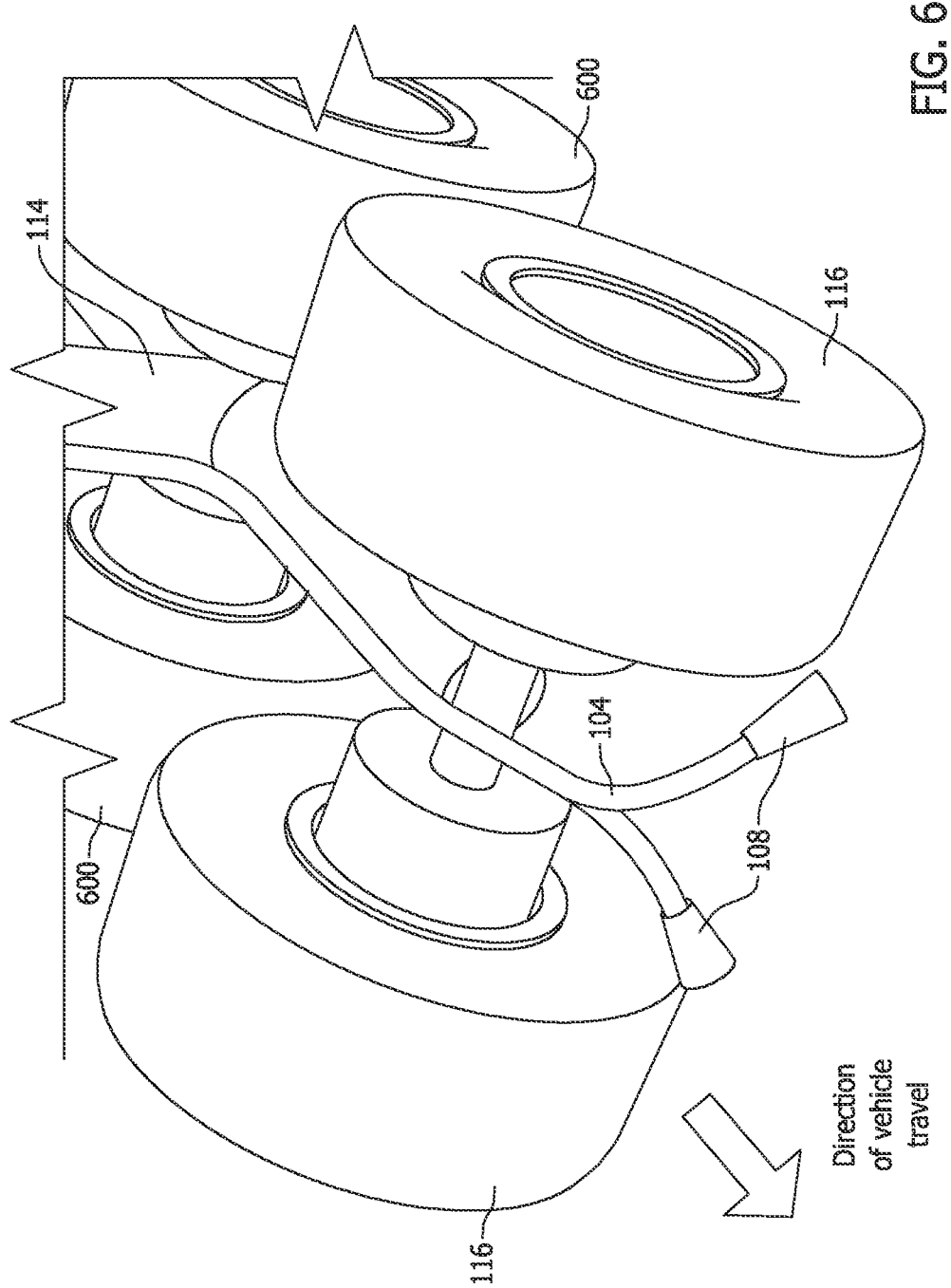
FIG. 6 is a perspective view of the implementation of FIG. 3.
Figure 7:
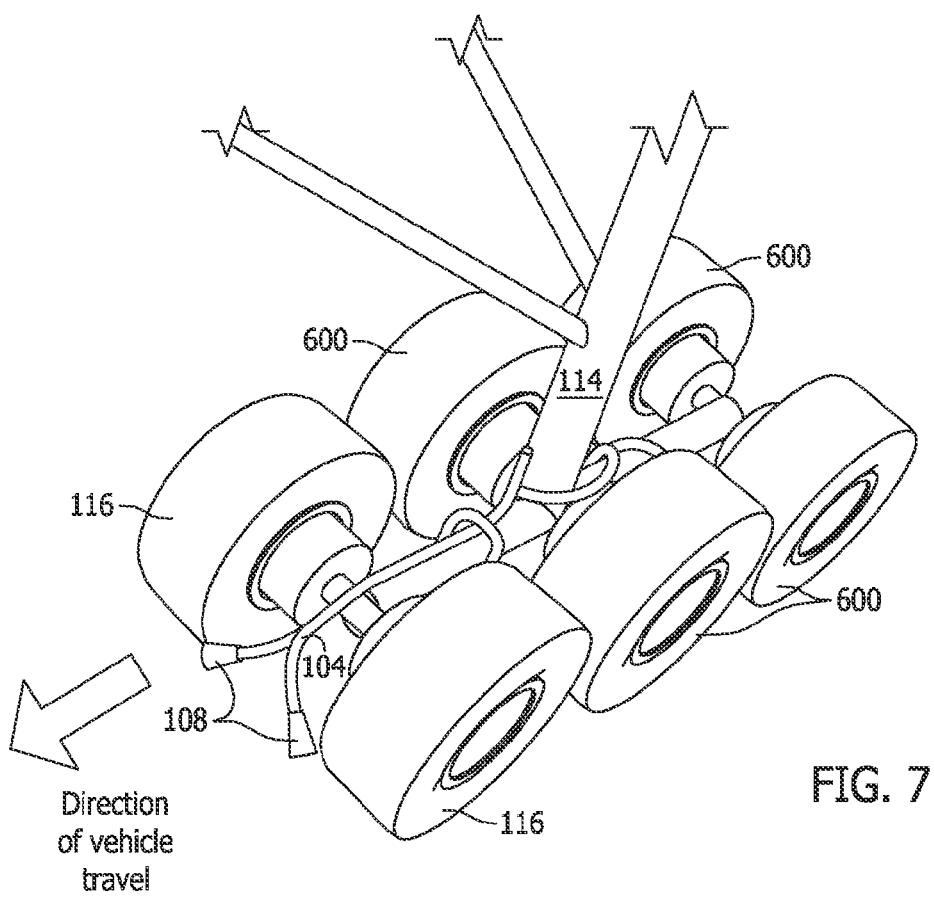
FIGS. 7-8 are perspective views of an implementation of an exemplary anti-skid system including individual nozzles for forward tires and rearward tires.
Figure 8:
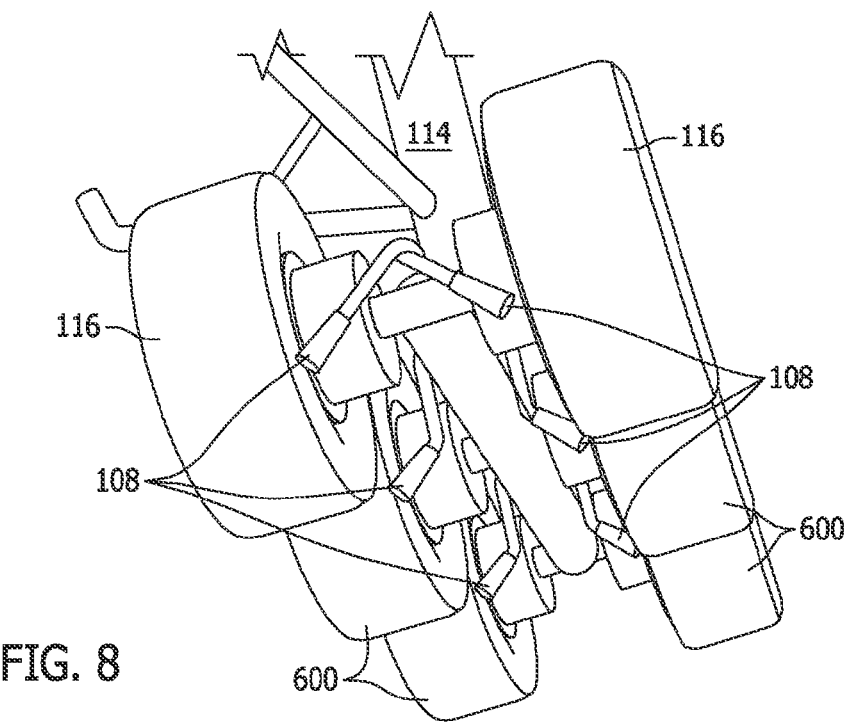

Referring now to FIGS. 3 and 6, aircraft 200 includes an anti-skid system 100 provided on at least one of the tire supports 114. An enlarged view 300 of the anti-skid system 100 is illustrated. In this implementation, the nozzle 108 is configured to supply cooling agent 122 in a swath forward of at least one tire 116 such that the cooling agent 122 is distributed in front of the tire. In the implementation shown in FIGS. 3 and 6, each forward tire 116 is provided with a nozzle 108 configured to individually supply cooling agent in front of the respective tire, but additional tires 600 rearward of the tires 116 are not provided with a nozzle 108. In yet another implementation, for example as shown in FIGS. 7 and 8, each tire 116 and one or more tires 600 rearward of tires 116 is provided with a nozzle 108 configured to individually supply cooling agent in front of the respective tire. As used herein "forward" refers to upstream of the direction of travel (indicated by the arrows in FIGS. 3 and 6-8).

Figure 4:
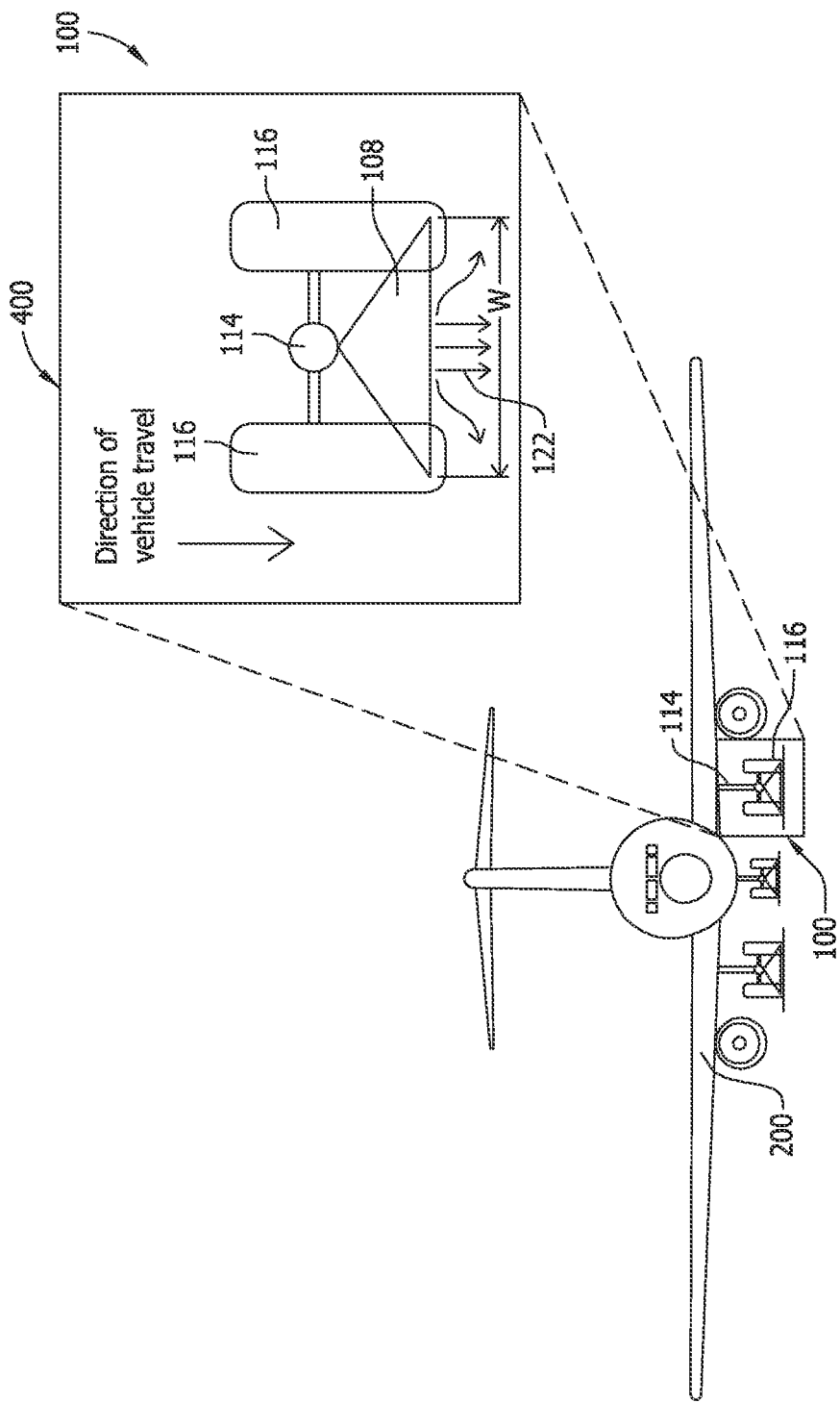
FIG. 4 illustrates an implementation of an exemplary anti-skid system with a single nozzle for applying cooling agent to one or more tires.

FIG. 4 illustrates another implementation of an anti-skid system 100. An enlarged view of the anti-skid system 100 is shown in box 400. However, in this implementation, nozzle 108 is a wide nozzle configured to substantially evenly distribute dispensed cooling agent 122 across the entire width W of one or more tires 116. Of course, one or more additional nozzles 108 may be provided to distribute cooling agent 122 to any tires rearward of tires 116.

Figure 5:
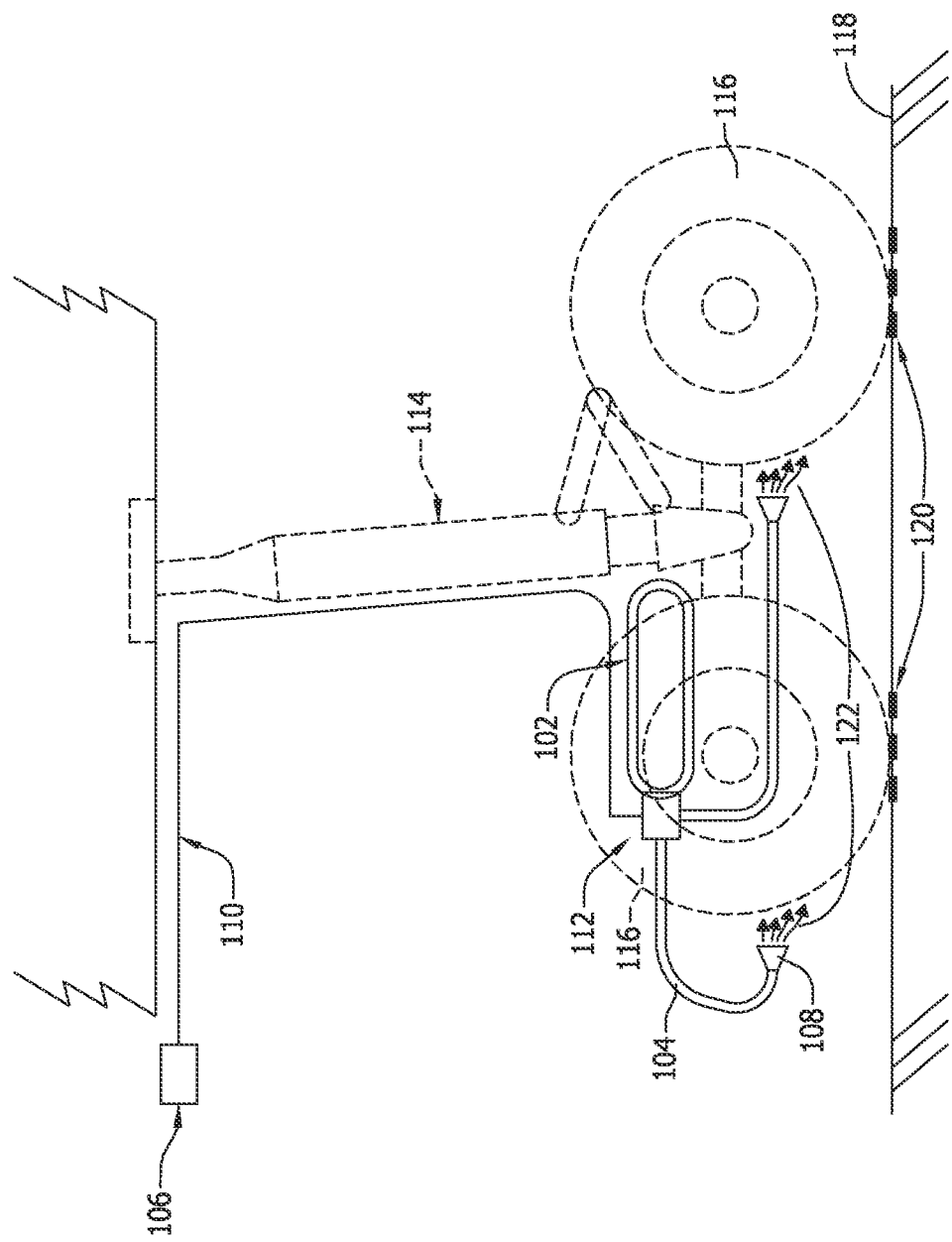
FIG. 5 illustrates implementations of an exemplary anti-skid system, applying the cooling agent on the tire.

In the implementation illustrated in FIG. 5, the anti-skid system 100 is configured such that nozzle 108 is positioned to dispense cooling agent directly onto the one or more of tires 116. For example, the cooling agent 122 may be dispensed directly onto the tire at a location approximately 5 inches to 10 inches from surface 118. As such, the cooling agent 122 is deposited onto the tire 116 and carried by the tire such that it is transferred to a position between the surface 118 and the tire 116 as the tire 116 rolls forward. In other implementations, the cooling agent 122 may be dispensed directly onto one or more of tires 116 at a distance greater than or less than 5 inches to 10 inches above the surface 118.

In use, in one implementation the anti-skid system 100 is used to enhance the friction between tires 116 and the surface 118. For example, aircraft 200 may be in-flight and descending to land on a runway (e.g., surface 118). The runway has one or more icy patches 120 on surface 118. In one implementation, the anti-skid system is activated, either automatically by an altitude sensor or manually by operator control) before the aircraft touches-down on the surface 118. As used herein, "touch down" refers to the tires 116 making initial contact with surface 118 during landing. In this implementation, the control system 106 sends a signal to valve 112 initiating the flow of cooling agent 122 from outlet 107. As the cooling agent 122 is dispensed from outlet 107, it is in the form of granules or particles, as discussed in a manner above. The outlet 107 is positioned upstream of the tire, and the outlet 107 may be positioned substantially centerline of the tire to function more effectively in dispensing the cooling agent. The cooling agent particles thus become entrained between the tires 116 and the icy patches 120, enhancing the friction therebetween, similar to sand or the like. Subsequently, the cooling agent particles sublimate, melt and/or evaporate, and accordingly no FOD is left on the surface 118.

Without being bound to a particular theory, based on the physical characteristic of water molecules, the freezing temperature of water decreases when under pressure. For example, when ice on the road surface is subjected to the load of the tire 116, the freezing temperature of the icy patch 120 under the tire is reduced, thereby causing a thin film of liquid water between the tire 116 and the surface 118. Such thin film of liquid water may act like a lubricant, reducing the coefficient of friction between the surface 118 and the tire 116. Thus, in another implementation the cooling agent 122 is introduced between the tire 116 and the road surface 118 in any state (i.e., gas, liquid or solid) that will cause the thin film of liquid water to re-freeze into solid ice. Thus, the solid ice provides a substantially solid surface between the tire 116 and the surface 118 of the road, enhancing the coefficient of friction between the tire 116 and the surface 118. In this implementation of the anti-skid system the cooling agent 122 at least in part functions as a liquid water film freezing agent.

In other use examples, the anti-skid system 100 is activated based upon a detection result of sensor 124. For example, aircraft 200 may be in-flight and descending to land on a runway (e.g., surface 118). The runway has one or more icy patches 120 on surface 118. In one aspect, as the aircraft touches down, sensor 124 detects a "weight-on-wheels" condition, and the anti-skid system is activated to dispense cooling agent from outlet 107. In other exemplary implementations, the sensor 124 may detect one or more conditions such as vehicle speed, tire-skid, temperature, tire pressure, atmospheric pressure, humidity level or the like. In such implementations, if the sensor detects, for example, that the tires are in a skidding condition, the control system 106 then activates the valve 112 such that cooling agent is dispensed from outlet 107. In other implementations, the sensor 124 may detect a predetermined value of one or more of the vehicle speed, tire-skid, temperature, tire pressure, atmospheric pressure, humidity level or the like, and the control system is activated upon the sensor 124 detecting the predetermined condition. As the cooling agent 122 is dispensed from outlet 107, it is in the form of granules or particles, as discussed in a manner above. The cooling agent particles thus become entrained between the tires 116 and the icy patches 120, enhancing the friction therebetween, similar to sand or the like. Subsequently, the cooling agent particles sublimate, melt and/or evaporate. Accordingly, no FOD is left on the surface 118. In another implementation, the cooling agent 122 is dispensed directly between the tire 116 and the road surface 118 to cause the thin film of liquid water to re-freeze into solid ice. The solid ice thus provides a substantially solid surface between the tire and the surface 118, enhancing the coefficient of friction between the tire 116 and the surface 118. In this implementation of the anti-skid system the cooling agent 122 at least in part functions as a liquid water film freezing agent.

Figure 10:
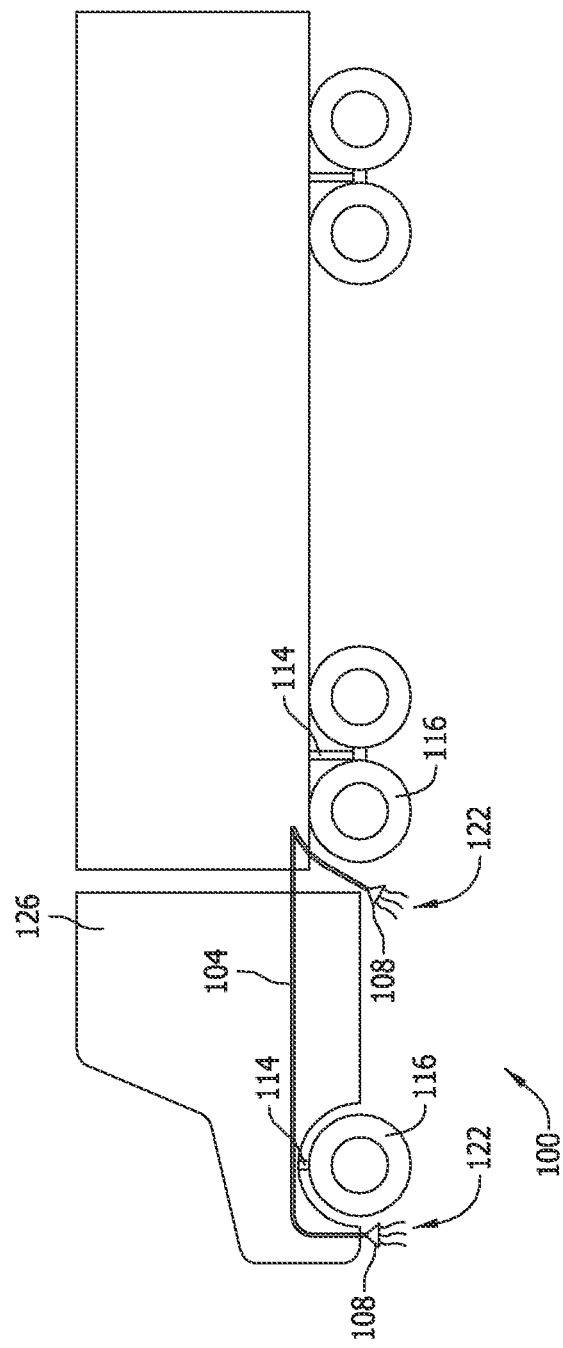
FIG. 10 illustrates a side view of an exemplary anti-skid system incorporated on a truck.

In the embodiment of FIG. 10, vehicle 126 is a ground vehicle shown as a tractor-trailer truck. In this embodiment, the anti-skid system 100 is coupled to vehicle 126 such that one or more nozzles 108 are configured to provide cooling agent 122 to one or more tires 116 of the truck.

The above implementations may be encompassed by one or more methods.

In some implementations, the above described systems and methods may include implementations that are electronically or computer controlled via controller 106. The implementations described herein are not limited to any particular controller or processor for performing the processing and tasks described herein. The term controller or processor, as used herein, is intended to denote any machine capable of performing the calculations, or computations, necessary to perform the tasks described herein. The terms controller and processor also are intended to denote any machine that is capable of accepting a structured input and of processing the input in accordance with prescribed rules to produce an output. It should also be noted that the phrase "configured to" as used herein means that the controller/processor is equipped with a combination of hardware and software for performing the tasks of various aspects of the disclosure, as will be understood by those skilled in the art. The term controller/processor, as used herein, refers to central processing units, microprocessors, microcontrollers, reduced instruction set circuits (RISC), application specific integrated circuits (ASIC), logic circuits, and any other circuit or processor capable of executing the functions described herein.

Such electronically and computer controlled implementations described herein embrace one or more computer readable media, including non-transitory computer readable storage media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Aspects of the disclosure transform a general-purpose computer into a special-purpose computing device when configured to execute the instructions described herein. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

A controller or processor as described herein may include system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Exemplary implementations of the anti-skid systems and methods are described above in detail. The systems and methods are not limited to the specific implementations described herein, but rather, components of the systems may be utilized independently and separately from other components described herein. For example, the components may also be used in combination with other vehicles, systems, methods, and apparatuses, and are not limited to practice with only the systems and apparatus as described herein. Rather, the exemplary implementations can be implemented and utilized in connection with many other applications.

Although specific features of various implementations of the disclosure may be shown in some drawings and not in others, this is for convenience only. In accordance with the principles of the disclosure, any feature of a drawing may be referenced and/or claimed in combination with any feature of any other drawing.

This written description uses examples to disclose various implementations, including the best mode, and also to enable any person skilled in the art to practice the aspects of the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of increasing friction between a tire of a vehicle and an icy surface, comprising:
    dispensing a cooling agent in a first physical state comprising a plurality of solid particles such that at least a portion of the plurality of solid particles is distributed between the tire and the icy surface, wherein the plurality of solid particles are configured to sublimate after being dispensed, and wherein the cooling agent acts as a liquid water film cooling agent to freeze the liquid water film and provide a substantially solid surface between the tire and the icy surface, and wherein the cooling agent leaves no solid particles as foreign object debris (FOD) following dispensation;
    dispensing the cooling agent in a second physical state comprising a gaseous state such that the second physical state acts as the liquid water film cooling agent to freeze the liquid water film and provide a substantially solid surface between the tire and the icy surface; and
    dispensing a flow additive together with the cooling agent, wherein dispensing the flow additive comprises compressing the flow additive, channeling the flow additive through a chiller, and mixing the flow additive with the cooling agent.

2. The method according to claim 1, further comprising sensing a condition of the vehicle, and dispensing the cooling agent based upon the sensed condition.

3. The method according to claim 1, further comprising sensing an atmospheric condition comprising a temperature, and dispensing the cooling agent based on the sensed atmospheric condition.

4. The method according to claim 1, further comprising dispensing the cooling agent through a nozzle such that the dispensed cooling agent is sprayed in a swath approximately a width of the tire.

5. The method according to claim 1, further comprising expanding the cooling agent through a conduit to form the plurality of solid particles before dispensing the solid particles through a nozzle.

6. The method according to claim 1, further comprising sensing a weight-on-wheels condition of the vehicle, wherein the vehicle is an aircraft, and initiating dispensing of the cooling agent when the weight-on-wheels condition is sensed, wherein the weight-on-wheels condition is satisfied by at least one aircraft wheel contacting the surface during landing.

7. The method according to claim 1, wherein the cooling agent is dispensed directly onto the tire.

8. The method according to claim 1, wherein the vehicle is an aircraft.

9. A system for increasing friction between a tire and an icy surface, comprising:
    a supply of a cooling agent in a first physical state comprising a plurality of solid particles and in a second physical state comprising a gaseous state;
    a conduit in fluid communication with the supply of cooling agent;
    an outlet for dispensing the cooling agent from the conduit, the outlet configured to supply a dispensed cooling agent to at least one of the icy surface and the tire, wherein the plurality of solid particles are configured to sublimate after being dispensed such that the cooling agent leaves no solid particles as foreign object debris (FOD) following dispensation, and wherein the cooling agent acts as a liquid water film cooling agent to freeze the liquid water film and provide a substantially solid surface between the tire and the icy surface; and
    a supply of a flow enhancing material configured to be mixed with the supply of the cooling agent, the supply of flow enhancing material in fluid communication with the outlet, wherein the flow enhancing material is channeled through a compressor and a chiller before being mixed with the cooling agent.

10. The system according to claim 9, wherein the cooling agent comprises carbon dioxide.

11. The system according to claim 9, further comprising a dispensing nozzle configured to distribute the dispensed cooling agent from the outlet.

12. The system according to claim 9, further comprising a sensor and a control system, the control system configured to initiate dispensing of the cooling agent upon the sensor detecting a predetermined condition.

13. The system according to claim 9, further comprising a control system configured to control one or more of a dispensing time, dispensing width and dispensing amount of the dispensed cooling agent.

14. An aircraft landing system, comprising:
    a landing gear including at least one tire;
    a supply of a cooling agent in a first physical state comprising a plurality of solid particles and in a second physical state comprising a gaseous state;
    a conduit in fluid communication with the supply of cooling agent;
    an outlet for dispensing the supply of cooling agent from the conduit, the outlet configured to supply a dispensed cooling agent to at least one of an icy surface and the tire, wherein the plurality of solid particles are configured to sublimate after being dispensed such that the cooling agent leaves no solid particles as foreign object debris (FOD) following dispensation, and wherein the cooling agent acts as a liquid water film cooling agent to freeze the liquid water film and provide a substantially solid surface between the tire and the icy surface; and
    a supply of a flow enhancing material configured to be mixed with the supply of the cooling agent, the supply of flow enhancing material in fluid communication with the outlet, wherein the flow enhancing material is channeled through a compressor and a chiller before being mixed with the cooling agent.

15. The system according to claim 14, wherein the outlet is positioned upstream of the tire.

16. The system according to claim 14, further comprising a vehicle weight-on-wheel sensor, wherein the vehicle is an aircraft, and a control system configured to initiate dispensing the cooling agent upon the weight-on-wheel sensor detecting a weight-on-wheels condition, wherein the weight-on-wheels condition is satisfied by at least one aircraft wheel contacting the surface during landing.

17. The system according to claim 14, wherein the supply of cooling agent is a supply of carbon dioxide.

18. The system accordingly to claim 14, further comprising an auger to dispense the cooling agent.

* * * * *